A. BECK.
Churning Apparatus.
No. 205,521.          Patented July 2, 1878.
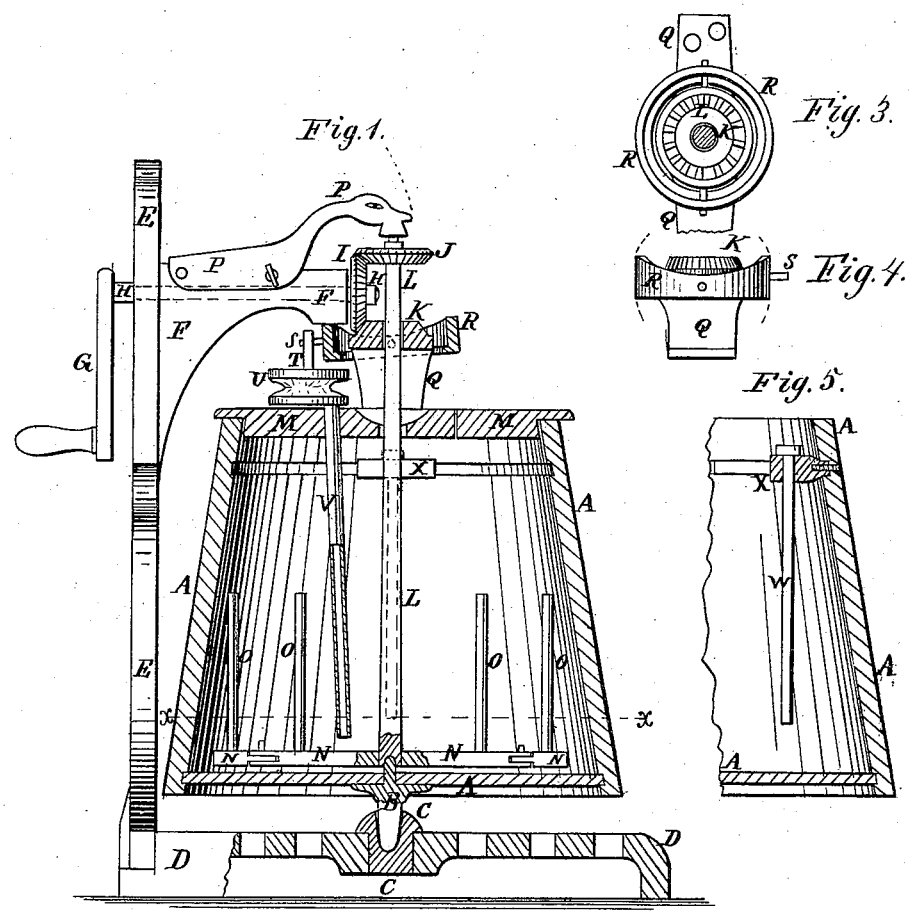
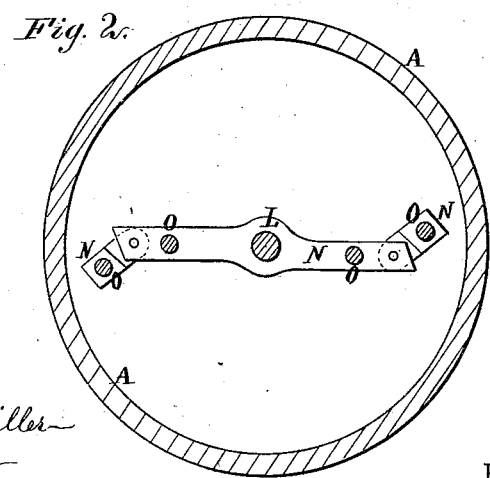
WITNESSES:
Henry N. Miller
C. Sedgwick
INVENTOR:
A. Beck
BY Munn & Co.
ATTORNEYS.

UNITED STATES PATENT OFFICE.

ANDREW BECK, OF WAVERLY, MINNESOTA.

IMPROVEMENT IN CHURNING APPARATUS.

Specification forming part of Letters Patent No. 205,521, dated July 2, 1878; application filed April 22, 1878.

*To all whom it may concern:*

Be it known that I, ANDREW BECK, of Waverly, in the county of Wright and State of Minnesota, have invented a new and useful Improvement in Churning Apparatus, of which the following is a specification:

Figure 1 is a side view of my improved churning apparatus, partly in vertical section, to show the construction. Fig. 2 is a horizontal section of the churn body and dasher, taken through the line $x\ x$, Fig. 1. Fig. 3 is a detail top view of the lower gear-wheel and cam-ring. Fig. 4 is a side view of the same. Fig. 5 is a detail section of a part of the churn-body.

Similar letters of reference indicate corresponding parts.

The object of this invention is to furnish an improved churning apparatus which shall be simple in construction, convenient in use, easily operated, and effective in operation, enabling the butter to be brought very quickly and producing butter of a superior quality.

The invention consists in the combination of the detachable arm, the three beveled gear-wheels, the dasher-shaft, the cross-bar, provided with the upwardly-projecting arms and the stationary downwardly-projecting arms, with the cover, the rotating churn-body, and the arm, standard, and platform; and in the combination of the oscillating cam-ring, the bellows, and the pipe with the revolving churn-body, the cover, and the arm of the standard, as hereinafter fully described.

A represents the churn-body, to the center of the bottom of which is attached a pivot, B, the upper part of which passes up through a hole in said bottom to serve as a pivot to the dasher, and its lower part enters and works in a socket, C, attached to the center of the platform or base-frame D of the machine.

The double pivot B is made with a flange, which rests against the lower side of the bottom of the churn-body A, and by means of which the said pivot is secured to the said bottom.

To one side of the platform D is attached the lower end of a standard, E, to the upper part of which is attached, or upon it is formed, an arm, F, which projects inward, so as to be over the upper part of the churn-body.

G is the crank by which the machine is operated, and which is attached to the outer end of a shaft, H. The shaft H passes longitudinally through the arm F, and to its forward end, at the inner end of the said arm F, is attached a bevel-gear wheel, I, the teeth of which mesh into the teeth of the bevel-gear wheels J and K, placed above and below it.

The bevel-gear wheel J is attached to the upper end of the dasher-shaft L, which passes down through the lower gear-wheel K, through the churn-cover M, and to its lower end is attached a cross-bar, N.

To the cross-bar N are attached upwardly-projecting arms O, which, as the dasher-shaft L is revolved, are carried around through the milk, agitating it and bringing the butter in a very short time.

In case a tapering churn is used, the end parts of the cross-bar N are jointed, as shown in Figs. 1 and 2, so that by turning the said jointed parts forward, as shown in Fig. 2, the dasher may be readily removed from the churn-body. The shoulders of the joints of the cross-bar N are inclined, as shown in Fig. 2, so that when the dasher is turned forward the said cross-bar N will be straight.

The lower end of the dasher-shaft L revolves upon the upper pivot of the double pivot B, and its upper end revolves in a socket in the end of an arm, P, the outer end of which is secured to the upper part of the arm F, so that it may be swung back when desired to allow the dasher to be removed.

The lower bevel-gear wheel K is attached to a bracket, Q, which is attached to the churn-cover M upon the opposite sides of its center, so that the churn-body A may be rotated upon its pivot at the same time the dasher L N O is rotated, but in the opposite direction, so as to increase the agitation of the milk.

To enable this to be done, the cover M must be secured to the top of the churn-body A by screws, pins, or other convenient fastenings, so that the said churn-body may be rotated by power applied to the said cover.

To the opposite sides of the bevel-gear wheel K are pivoted the opposite sides of a ring, R, so that the said ring may rock upon the said pivots. The upper edge of the ring R, between its pivots, is concaved or hollowed out, as shown in Figs. 1 and 4, forming cams upon the said upper edge.

To one side of the ring R is attached a pin, S, which is pivoted to a short stud, T, attached to the upper plate of a bellows, U, the lower plate of which is attached to the churn-cover M. The cam-ring R is so arranged that its upper edge may rest against the lower side of the end of the arm F, as shown in Fig. 1, so that it may be rocked upon its pivots as it is carried around by and with the bevel-gear wheel K. This rocking movement of the cam-ring R works the bellows and forces air down through the pipe V into the lower part of the churn-body A, to assist in bringing the butter and to drive off any odor or sourness that may be in the milk, producing a sweet and superior quality of butter.

The agitation of the milk is further increased by the rods or arms W, which are attached to blocks X, secured to the upper part of the inner surface of the churn-body A, by grooves, screws, or other convenient means, and which project nearly to the bottom of the said churn-body in such positions that the upwardly-projecting arms O will pass upon their opposite sides when the dasher and churn-body are revolved.

Having thus described my invention, I claim as new and desire to secure by Letters Patent—

1. The combination of the detachable arm P, the three beveled-gear wheels I J K, the dasher-shaft L, the cross-bar N, provided with the projecting arms O, and the stationary downwardly-projecting arms W with the cover M, the rotating churn-body A, and the arm F, standard E, and platform D, substantially as herein shown and described.

2. The combination of the oscillating cam-ring R, the bellows U, and the pipe V with the revolving churn-body A, the cover M, and the arm F of the standard E, substantially as herein shown and described.

ANDREW BECK.

Witnesses:
  JOHN DUNN,
  ESTHER TANNER.